United States Patent [19]
Amiard et al.

[11] 3,725,366
[45] Apr. 3, 1973

[54] CYCLOALKENYL TRICYCLOALKENE COPOLYMERS AND PRODUCTION THEREOF

[75] Inventors: Yves Amiard, Pau; Jean-Paul Bellissent, Billere, both of France

[73] Assignee: Societe Nationale Des Petroles D'Aquitaine, Courbevoie, France

[22] Filed: Feb. 4, 1971

[21] Appl. No.: 112,796

Related U.S. Application Data

[63] Continuation-in-part of Ser. No. 833,696, June 16, 1969, Pat. No. 3,655,796.

[52] U.S. Cl. ......260/80.78, 260/79.5 B, 260/87.5 R, 260/88.2 D, 260/648 R, 260/666 PY
[51] Int. Cl. .............................................C08f 17/00
[58] Field of Search.....................260/80.78, 666 PY

[56] References Cited

UNITED STATES PATENTS 3,527,739  9/1970  Valvossori.........................260/80.78

*Primary Examiner*—James A. Seidleck
*Assistant Examiner*—Roger S. Benjamin
*Attorney*—Ostrolenk, Faber, Gerb & Soffen

[57] ABSTRACT

Cycloalkenyl tricycloalkenes are novel polycyclic compounds which may include substituents such as methyl, ethyl or others. They can be prepared by reacting a substituted or unsubstituted cyclic 1,3-diene with a 2,2'-dicycloalkenyl compound. The cycloalkenyl tricycloalkenes can be used to produce elastomers by copolymerization with non-conjugated polyenes and/or olefins.

10 Claims, No Drawings

CYCLOALKENYL TRICYCLOALKENE COPOLYMERS AND PRODUCTION THEREOF

This is a continuation-in-part of application Ser. No. 833,696 now U.S. Pat. No. 3,655,796, issued Apr. 11, 1972, filed June 16, 1969.

The present invention relates to a new series of homologous polycyclic compounds, the cycloalkenyl tricycloalkenes, which can carry various substitutions. It is also concerned with a process for the preparation of these new compounds and with materials produced from them.

These polycyclic compounds of the invention are of very great interest in the production of elastomers by copolymerization with non-conjugated polyenes and/or olefins. The cycloalkyl tricycloalkenes according to the invention can be represented by the following general formula:

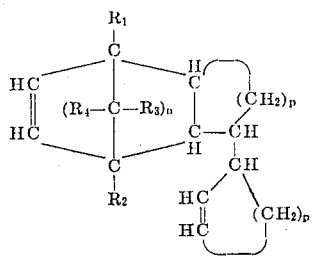

in which each of the radicals $R_1$, $R_2$, $R_3$, $R_4$, which may be the same or different, can be hydrogen, a halogen or a linear or branched alkyl radical having from one to 10 carbon atoms, while $n$ can be 1 or 2 and $p$ can be any value from 2 to 5.

Among the preferred compounds of the invention are those for which the symbols $R_1$ to $R_4$ represent hydrogen or relatively light radicals having from one to six carbon atoms, such as methyl, ethyl, isopropyl and butyl. By way of example, mention may be made of 5-cyclopen-2'-en-yl-tricyclo-(5, 2, 1, 0$^{2,6}$)-dec-8-ene and its derivatives, 6-cyclohex-2'-enyl-tricyclo-(6,2,1,0$^{2,7}$)-undec-9-ene and its derivatives, 8-cyclooct-2'-en-yl-tricyclo-(8,2,1,0$^{2,9}$)-tridec-11-ene and its derivatives, and 5-cyclopent-2'-en-yl-tricyclo-(5,2,2,0$^{2,6}$)-undec-8-ene.

The invention provides a process for the preparation of the cycloalkenyl tricycloalkenes of the invention which comprises causing the reaction of a cyclic 1,3-diene of the general formula

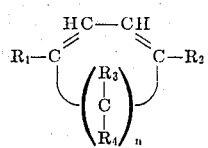

(in which $R_1$ to $R_4$ have the foregoing meanings and $n$ is 1 or 2) with a 2,2'-dicycloalkenyl of the general formula

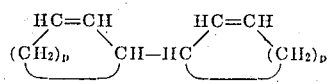

(in which $p$ is 2,3,4 or 5), the reaction taking place at temperatures which are between 100° and 500° C., preferably between 150° and 250° C., and at pressures which may be from one to 1,500 atmospheres.

The reaction can be carried into effect without a solvent, or in the presence of a solvent, which latter can be a hydrocarbon, such as hexane, heptane, cyclohexane, benzene, toluene or others, or an ether, such as dioxane, or tetrahydrofuran. The ratio by weight between the solvent and the reactants in the reaction mixture is generally between 0.5 and 20 to 1.

If the reaction between the cyclic diene and the dicycloalkenyl takes place in the absence of a solvent, a useful feature of the invention consists in using an excess of dienophile with respect to the diene. The molar ratio between the dienophile and diene can vary from 1.1 to 30, but it is preferably between 3 and 12. The dienophile excess is recovered by distillation when the reaction is completed.

The reaction time can vary from 1 to 200 hours, depending on the temperature, but it is preferably between 10 and 40 hours.

It is advantageous for a small proportion of hydroquinone to be added to the reaction mixture; this hydroquinone prevents oxidation of the products.

As the cyclic 1,3-diene which can be used in the reaction according to the invention, cyclopentadiene, 1-methyl cyclopentadiene, 5-methyl cyclopentadiene, cyclohexa-1,3-diene, 5-methyl cyclohexa-1,3-diene can be mentioned as preferred examples.

The 2,2'-dicycloalkenyls corresponding to the foregoing formula which can be caused to react with the dienes, include 2,2'-dicyclopentenyl, 2,2'-dicyclohexenyl, 2,2'-dicyclooctenyl and 2,2'-dicycloheptenyl.

A very valuable use of the cycloalkenyl tricycloalkenes according to the invention is in the preparation of elastomers by copolymerization with non-conjugated polyenes or olefins.

The copolymers obtained are amorphous copolymers of high molecular weight, having a degree of unsaturation which is sufficient for them to be able to undergo the conventional sulphur vulcanization. These copolymers can also be vulcanized by means of free radical generators.

After vulcanization, the new copolymers can lead to products having good mechanical properties, particularly breaking strengths, which may be higher than 130 kg/cm$^2$ and elongations at break, which are, for example, in the range between 150 and 300 percent. The vulcanized elastomer is useful in the preparation of molded articles, wire coatings, pipes and conduits, and for other industrial moldings and extruded products.

By suitable choice of the tricycloalkenes to be copolymerized and of the polymerization conditions, it is possible to cause the mechanical characteristics of the resulting elastomers to be varied at will.

The copolymerization of the cycloalkenyl tricycloalkenes of the invention with the non-conjugated olefin or olefins and/or the non-conjugated polyene or polyenes can be carried out by introducing the olefin or olefins and/or the polyene or polyenes into an organic liquid medium containing at least one of the said tricycloalkenes and an appropriate catalyst system, and by maintaining them all in contact until the formation of copolymers of olefines and/or of polyenes with the said cycloalkenyl tricycloalkene or tricycloalkenes. The olefins preferably contain two to 10 carbon atoms. The most preferred compounds include ethylene and the three to 10 carbon atom alpha olefins such as propylene and 1-butene. Typical non-conjugated olefins include 1,4-pentadiene and 1,4-hexadiene. The polyenes are derived from the foregoing monomers.

Catalyst systems which are quite suitable comprise an organometallic compound (A) of one or more metals of the Groups I, II, or III of the Periodic System and a compound (B) of a transition metal of Groups IV to VIII of the said System. Preference is particularly given to catalyst system containing organo-aluminum compounds which may or may not be halogenated, and vanadium compounds, such as for example halides and oxyhalides of compounds in which at least one of the valencies of the metal is satisfied by a hetero atom, particularly oxygen or nitrogen, bonded to an organic group (e.g., triacetylacetonate). Excellent results are obtained with catalyst systems which contain, for example, vanadium tetrachloride (VClhd 3) or vanadium oxychloride ($VOCl_3$) and diethylaluminun chloride or ethylaluminum sesquichloride.

The catalyst system can even include a certain proportion of an activator and particularly of an alkoxyalkyl halosulphate or halosulphite, such as ethoxyethyl chlorosulphate or chlorosulphite, etc.; of a halosulphinyl or halosulphonyl thiophene, such as 2-chlorosulphonyl thiophene, 2,4-di-(chlorosulphonyl)thiophene, etc.; of a halogenated derivative of 5,8-dioxymethylene-Δ-1,4-hexahydronaphthalene, such as 1,2,3,4,9,9-hexachloro-5,8-dioxomethylene-Δ-1,4-hexahydronaphthalene, etc.; of a dichloroarylphosphine, such as dichlorophenylphosphine, etc.

In order to form the catalyst system, the compounds (A) and (B) may or may not be mixed before they are introduced into the reactor. The catalyst can thus be preformed and possibly "aged," in order to be introduced continuously or intermittently into the mixture to be polymerized.

The activator, if it is present, can be mixed with the catalyst before being introduced into the reaction mixture; it is also possible for the activator to be directly introduced into the mixture during polymerization, continuously or in fractions. In another method of procedure, the activator is first of all mixed with the compound or compounds of the transition metal or metals.

The catalyst system includes quantities of compounds A and B such that the molar ratio between the metal of compound A and the transition metal of compound B is between one and 30 and preferably between four and 10.

The quantity of activator which may be present can vary within wide limits. In particular, it is possible to use 0.5 to 25 moles of activator per gram atom of transition metal, but is is however necessary for the reaction medium to contain more of compound A, expressed as metal, than of activator.

It is understood that other catalyst systems suitable for the polymerization of olefins can also be employed. It would, for example, be possible to use catalyst systems formed by mixtures of allyl compounds of metals selected from chromium, tungsten, molybdenum or zirconium, with halides, oxyhalides, ester halides or esters of metals selected from titanium, zirconium, vanadium, chromium, molybdenum, tungsten or iron.

The copolymerization is effected in a suitable solvent, which is preferably formed by an aliphatic, or aromatic hydrocarbon, or cycloalkane, for example, heptane, cyclohexane, benzene, or mixtures of such solvents. Halogenated hydrocarbons which are neutral as regards the catalyst can also be used, for example, chloroform, chlorobenzene, tetrachlorethylene, etc. The olefins can themselves serve as a solvent and the copolymerization can, for example, be effected in liquid butene and/or propylene.

The copolymerization can be carried into effect at temperatures which are from $-50°$ to $+90°$ C., but it is preferable to conduct the said copolymerization at temperatures in the region of $0°$ C., for example, between $-10°$ and $+20°$ C.

The pressures usually employed during the polymerization vary from one to 10 atmospheres, but it is possible to work under higher pressures.

The proportion of cycloalkenyl tricycloalkene which is added to the olefins is so chosen that the final copolymer contains from 0.1 to 20 percent by weight of tricycloalkenyl groups.

The tricycloalkene or tricycloalkenes are generally introduced all at once into the reactor before the addition of the catalyst system. It is, however, possible for all or part of these compounds to be introduced during the polymerization in a continuous or intermittent manner. The copolymerization can be conducted continuously, and in this case, the solvent, the monomers and the catalyst system are continuously introduced into a polymerization zone, in amounts such that their time in the said zone is sufficient to obtain the desired concentration of copolymer in the reaction mixture.

When considering the preparation of ethylene/propylene/tricycloalkene copolymers, the lower limit for the ethylene content is not a determining factor, but the upper limit should preferably be 75 percent by weight in order to avoid a crystallinity of the polyethylene type. As regards the content of alpha-olefins in the amorphous copolymers, this can vary from 5 to 75 percent by weight. The tricycloalkene content of the copolymer can vary within very wide limits, for example, from 0.1 to 20 percent by weight, but is is preferable for it to lie between 1 and 10 percent by weight.

In carrying the copolymerization reaction into operation, the reaction medium is deprived of free oxygen by the passage of an inert gas, such as nitrogen, argon, etc., before the polymerization.

The time required for the copolymerization generally varies with the working conditions and it is usually between 30 minutes and 3 hours.

On completing the operation, the catalyst is destroyed in known manner, and the copolymer is separated from the solvent by coagulation by means of an alcohol, by steam distillation of the solvent or by any other method by which it is possible to separate a polymer from solutions containing it.

The following Examples, which are non-limitative illustrate the invention.

EXAMPLE 1 preparation of the cycloalkenyltricycloalkene.

20 g. (0.33 mole) of cyclopentadiene and 122 g. (0.91 mole) of dicyclopentenyl (dienophile/diene ratio = 2.7) are introduced into a cylindrical autoclave and 50 mg of hydroquinone are added. The autoclave is closed and it is heated to 180°–185° C. for 20 hours. The reaction medium is filtered and there are obtained 139 g. of a clear liquid which is distilled under vacuum. Then 98 g. of dicyclopentenyl which has not reacted are eliminated between 42°–44° C./4 mm. Hg. The remainder (i.e., 29.8 g.) distills between 105°–110° C./3 mm. Hg. It is formed of 73 percent of 5-cyclopen-2'-enyl-tricyclo(5,2,1,0$^{2.6}$)-dec-8-ene (referred to as compound M) represented by the following formula, the remainder being tricyclopentadiene:-

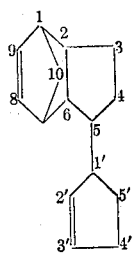

The yields of the product M are 60 percent with respect to the dicyclopentenyl and 35 percent with respect to the cyclopentadiene.

The 5-cyclopent-2'-en-yl-tricyclo-(5,2,1,0$^{2.6}$)-dec-8-ene as thus isolated has the following characteristics:
Boiling point 79°–80° C./0.2 mm.Hg.
Refractive index $n_D^{21}$ = 1.5220; Density 20° C.

Microanalysis
|  | C% | H% |
|---|---|---|
| Found | 88.92% | 10.04% |
| Calculated | 90.08% | 10.08% |

Copolymerization:

The tricycloalkene obtained is copolymerized with a mixture of ethylene and propylene.

The polymerization is effected in a cylindrical glass reactor with an internal diameter of 10 cm. and a capacity of 1,000 ml., said reactor being equipped with an agitator, a thermometer, two dropping funnels for the introduction of the catalyst, a condenser with an outlet tube for gases and a gas inlet tube which is terminated near the bottom of the reactor by a ring having several openings permitting a better diffusion of the gases introduced through the inlet tube. The reactor is immersed in a thermostatically controlled bath in order to maintain its temperature between −2° and +2° C.

Into the reactor, which is kept under a stream of nitrogen, there are introduced 630 ml. of previously dried and degasified n-heptane and 5 g. of 5-cyclopent-2'-en-yl-tricyclo-(5,2,1,0$^{2.6}$)-dec-8-ene.

The dropping funnels arranged above the reactor were cleansed and kept under a nitrogen atmosphere. Two millimoles of VOCl$_3$ in 60 ml. of anhydrous n-heptane are introduced into one funnel, while 10 millimoles of diethylaluminum monochloride (C$_2$H$_5$)$_2$AlCl in 60 ml. of anhydrous n-heptane are introduced into the other funnel.

The supply of nitrogen is stopped and then a mixture of purified propylene and ethylene in a molar ratio of 2:1 is introduced through the gas inlet tube, the mixture circulating at the rate of 99 standard liters per hour. After circulation of the gaseous mixture for 30 minutes, the propylene to ethylene molar ratio is brought to the value of 1 and the constituents of the catalyst are introduced dropwise over a 30 minute period.

The polymerization is stopped by adding 20 ml. of ethanol 60 minutes after the start of the injection of the catalysts.

The polymer solution is poured into ethanol for coagulating the terpolymer.

After drying this polymer under vacuum at 40° C., there are obtained 29.7 g. of a solid product having the appearance of a non-vulcanized elastomer.

Vulcanization of the copolymer:

Using a cylinder-type mixer, 100 parts by weight of the product which is obtained are mixed with 50 parts of HAF carbon black, five parts of zinc oxide, two parts of sulphur, one part of mercaptobenzthiazole and two parts of tetramethylthiuram disulphide.

The mixture is heated at 160° C. for 60 minutes in a press.

Characteristics of the vulcanized product:
| | |
|---|---|
| Tensile strength | 175 kg/cm$^2$ |
| Elongation at break | 190% |
| Shore A hardness | 75 |
| Rebound | 50% |

EXAMPLE 2

Preparation of the cycloalkenyl tricycloalkene:

The same operation as in Example 1 is repeated, but the autoclave is heated to 250°–260° C. After filtering the reaction mixture, 140 g. of a clear liquid are obtained. 100 g. of dicyclopentenyl which has not reacted are recovered by distillation. The product which remains is a mixture of 86 percent of compound M and 14 percent of tricyclopentadiene.

The yields of M are 45% relatively to the dicyclopentenyl and 25 percent relatively to the cyclopentadiene.

Copolymerization:

Example 1 is repeated, but in the polymerization step, the polymerization is stopped as soon as the catalysts have been completely injected.

Nineteen grams of a solid product are obtained, this having the appearance of an unvulcanized elastomer and containing 73 percent by weight of ethylene.

The terpolymer is then vulcanized, as in Example 1.

Characteristics of the vulcanized product:
| | |
|---|---|
| Tensile strength | 180 kg/cm$^2$ |
| Elongation at break | 170% |
| Shore A hardness | 80 |
| Rebound | 53% |

EXAMPLE 3

Preparation of the cycloalkenyl tricycloalkene:

Twenty grams (0.33 mole) of cyclopentadiene and 244 g. (1.82 mole) of dicyclopentenyl (dienophile/diene ratio = 5.5) and also 100 mg. of hydroquinone are introduced into the autoclave and heated at 180°–185° C. for 20 hours.

After the reaction mixture has been filtered, 258 g. of a clear yellow liquid are obtained. 210 g. of dicyclopentenyl which has not reacted are recovered by distillation, and then 35 g. of a mixture distilling between 105° and 110° C./2.5-3 mm.Hg.

This mixture contains 82% of compound M and 18 percent of tricyclopentadiene.

The yields of M relatively to the dicyclopentenyl and to the cyclopentadiene are respectively 56 and 47 percent.

The microanalysis of the isolated product M gives the following results, for the theoretical formula $C_{15}H_{20}$:

|  | C% | H% |
|---|---|---|
| Found | 90.03 | 10.17 |
| Calculated | 90.08 | 10.08 |

Copolymerization:

Example 1 is repeated, except for the introduction into the reactor of 600 ml. of anhydrous n-heptane instead of 630 ml., and for the fact that the 5-cyclopent-2'-en-yl-tricyclo-(5,2,1,0$^{2.6}$)-dec-8-ene is mixed with aluminum diethylmonochloride in 90 ml. of anhydrous n-heptane, the mixture being placed in one of the dropping funnels arranged above the reactor.

The polymerization is stopped 40 minutes after beginning the injection of the catalysts.

Twenty-seven grams of an elastomer are obtained and this is then vulcanized according to the conditions of Example 1.

Characteristics of the vulcanized product:
| Tensile strength | 210 kg/cm² |
|---|---|
| Elongation at break | 260% |
| Shore A hardness | 73 |
| Rebound | 53% |

EXAMPLE 4

Preparation of the tricycloalkene:

20 g. (0.33 mole) of cyclopentadiene, 366 g. (2.73 moles) of dicyclopentenyl (dienophile/diene ratio - 8.2) and 50 mg. of hydroquinone are introduced into the autoclave.

The mixture is heated at 180°–185° C. for 20 hours.

After the reaction mixture has been filtered, 376 g. of a clear liquid are obtained. By distillation, 330 g. of unreacted dicyclopentenyl are recovered and also 41 g. of a mixture containing 75% of 5-dicyclopent-2'-en-yl-tricyclo-(5,2,1,0$^{2.6}$)-dec-8-ene (compound M) and 25% of tricyclopentadiene.

The yields of M relatively to the dicyclopentenyl and to the cyclopentadiene are respectively 57 and 52 percent.

Copolymerization:

The operating procedure described in Example 1 is repeated, but replacing the heptane by benzene and using, as the catalyst system, 1.5 millimoles of $VCl_4$ and 12 millimoles of ethylaluminum sesquichloride of formula $1/2 [(C_2H_5)_3Al_2Cl_3]$.

The saturation of the solvent by the propylene-ethylene mixture is effected in 20 minutes instead of 30 minutes.

The polymerization is stopped as soon as the catalysts have been completely injected.

In this way, 28.8 g. of terpolymer comprising 62 percent by weight of ethylene are obtained.

The terpolymer is then vulcanized as in Example 1.

Characteristics of the vulcanized product:
| Tensile strength | 160 kg/cm² |
|---|---|
| Elongation at break | 190% |
| Shore A hardness | 75 |
| Rebound | 49% |

We claim:

1. A process which comprises interpolymerizing a cycloalkenyl tricycloalkene of the formula

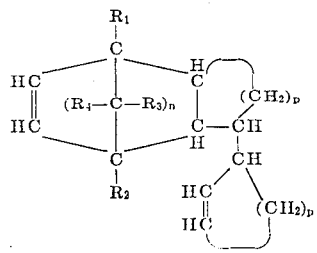

wherein $R_1$, $R_2$, $R_3$ and $R_4$ are individually selected from the group consisting of hydrogen, halogen and alkyl radicals of one to 10 carbon atoms, $n$ is 1 or 2, and $p$ is 2, 3, 4 or 5, with at least one unsaturated compound selected from the group consisting of olefins and polyenes in an organic fluid medium and in the presence of a catalyst system comprising an organometallic derivative of at least one metal of Groups I to III of the Periodic System and a vanadium compound.

2. The process of claim 1 wherein the olefin contains two to 10 carbon atoms.

3. The process of claim 1 wherein the interpolymerization is effected at a temperature of −50° to 90° C.

4. The process of claim 1 wherein the organometallic derivative is a halogenated aluminum alkyl and the vanadium compound is selected from the group consisting of vanadium halides and vanadium oxyhalides.

5. The process of claim 4 wherein the interpolymerization is effected at a temperature of −10° to 20° C., and wherein the unsaturated compound is selected from the group consisting of ethylene and alpha olefins of three to 10 carbon atoms.

6. An interpolymer of a cycloalkenyl tricycloalkene of the formula

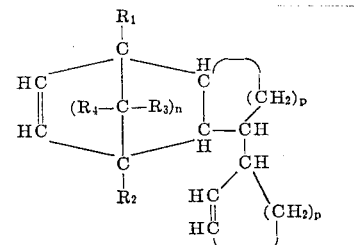

wherein $R_1$, $R_2$, $R_3$ and $R_4$ are individually selected from the group consisting of hydrogen, halogen and alkyl radicals of one to 10 carbon atoms, $n$ is 1 or 2, and $p$ is 2, 3, 4 or 5; ethylene; and a compound selected from the group consisting of alpha olefins of three to 10 carbon atoms and polyenes; said interpolymer having a tricycloaklkene content of 0.1–20 weight percent.

7. The interpolymer of claim 6 wherein said compound is propylene and wherein said cycloalkenyl tricycloalkene is 5-cyclopent-2'-en-yl-tricyclo-(5,2,1,0$^{2.6}$)-dec-8-ene.

8. The interpolymer of claim 6 having a tricycloalkene content of 1–20 weight percent.

9. The vulcanized copolymer of claim 6.

10. The process of claim 5 wherein the unsaturated compound is a mixture of ethylene and propylene.

* * * * *

PO-1050
(5/69)

UNITED STATES PATENT OFFICE
CERTIFICATE OF CORRECTION

Patent No. 3,725,366     Dated April 3, 1973

Inventor(s) Yves Amiard et al

It is certified that error appears in the above-identified patent and that said Letters Patent are hereby corrected as shown below:

On the cover page, read - - Claims priority France PV 155189 filed June 17, 1968 and France PV 175745 filed November 28, 1968 - -
Column 1, line 5, after "833,696" read - - , filed June 16, 1969 - -; line 6, delete ", filed June 16, 1969 - -; line 42, for "enyl" read - - en-yl - -.
Column 3, line 23, for "(VClhd3)" read: - - $(VCl_3)$ - -.
Column 5, line 15, for "enyl" read - - en-yl - -.
Column 8, line 64, for "20" read - - 10 - -.

Signed and sealed this 2nd day of April 1974.

(SEAL)
Attest:

EDWARD M. FLETCHER, JR.
Attesting Officer

C. MARSHALL DANN
Commissioner of Patents